May 3, 1932. R. L. JIRKA 1,856,812
BRAKE HEAD AND SHOE ASSEMBLY
Filed Oct. 7, 1931 3 Sheets-Sheet 1

Inventor
Ray L. Jirka
By Clarence A. O'Brien
Attorney

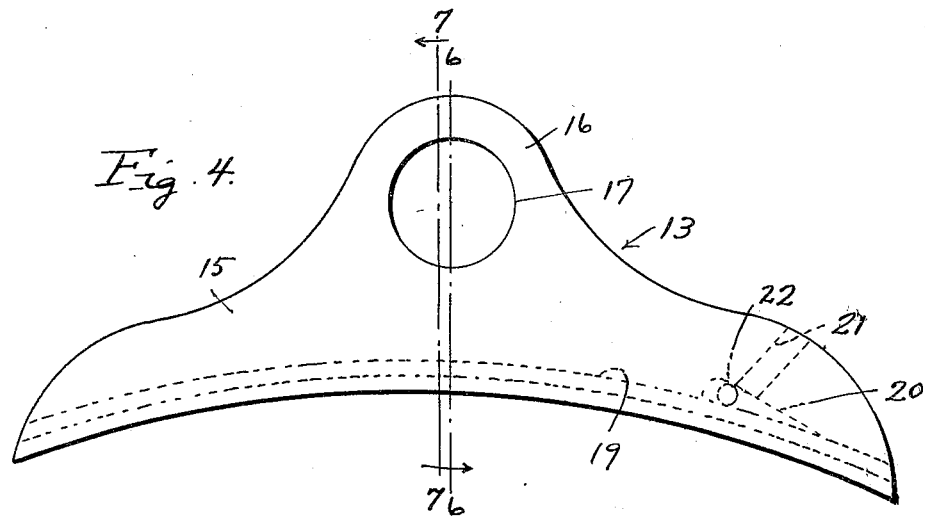
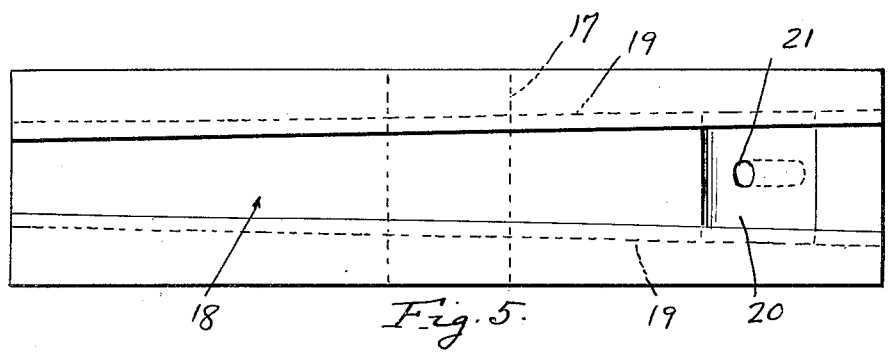
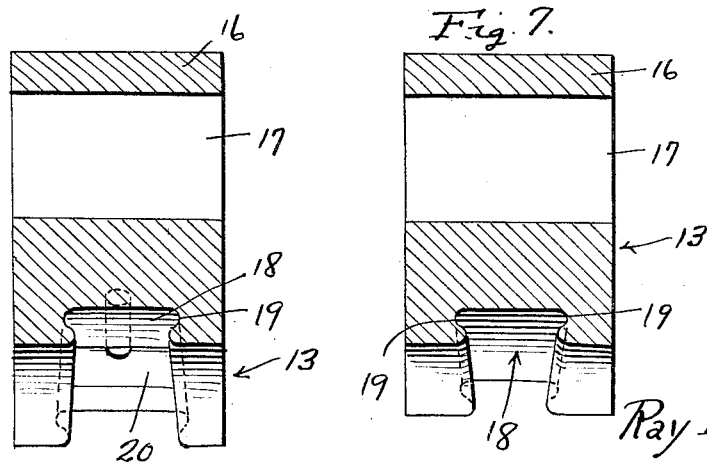

May 3, 1932. R. L. JIRKA 1,856,812
BRAKE HEAD AND SHOE ASSEMBLY
Filed Oct. 7, 1931 3 Sheets-Sheet 3
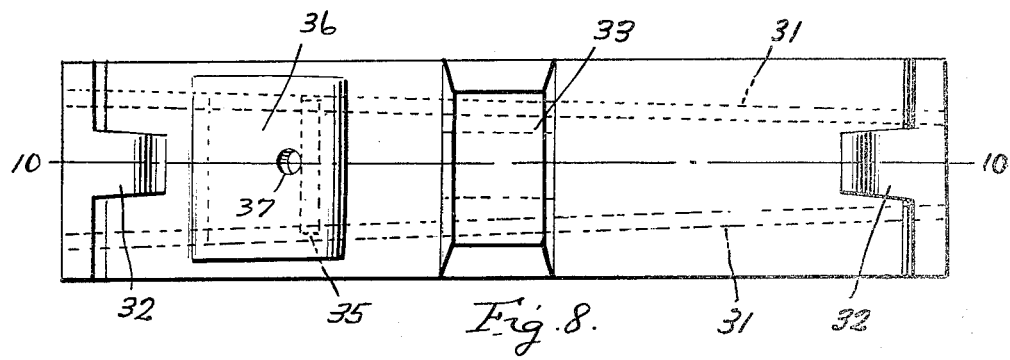
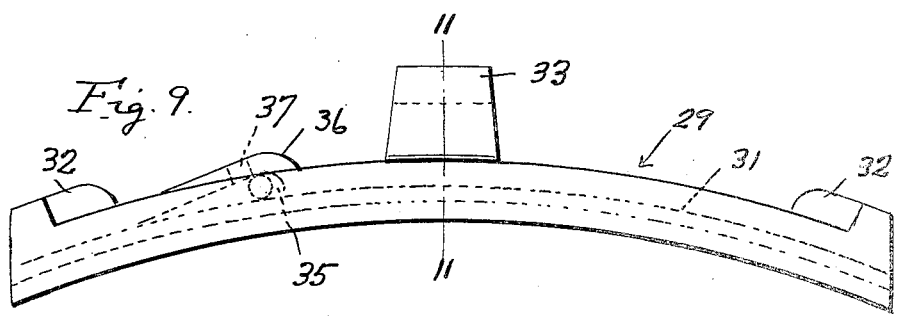
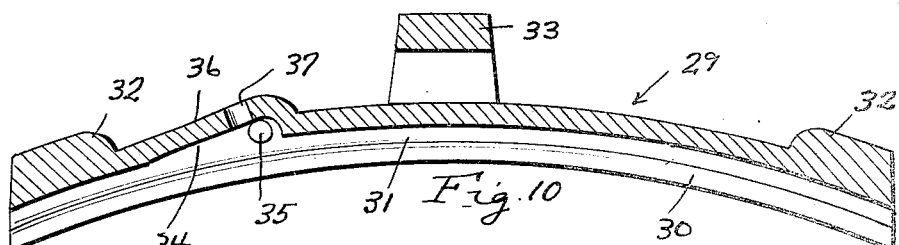
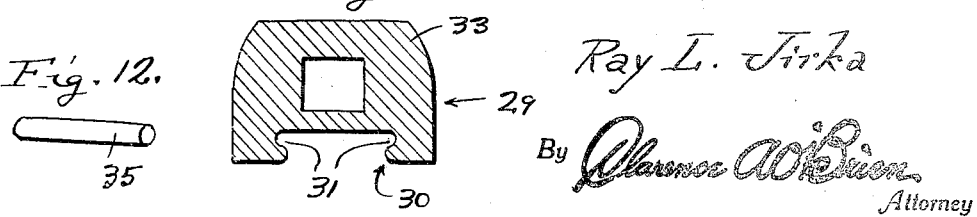
Inventor
Ray L. Jirka
By Clarence A. O'Brien
Attorney Patented May 3, 1932

1,856,812

UNITED STATES PATENT OFFICE

RAYMOND L. JIRKA, OF WESTERN SPRINGS, ILLINOIS

BRAKE HEAD AND SHOE ASSEMBLY

Application filed October 7, 1931. Serial No. 567,484.

This invention relates to an improved accessory for the brake equipment of railroad rolling stock, and has more particular reference to a combination brake head and shoe adapted to serve as a novel substitute for the present day one-piece brake shoes employed on locomotives, passenger coaches, freight cars and the like.

I have discovered the need for an improved structure of this class through my repeated observations of the objections and difficulties experienced with the present day brake shoe construction.

It is a matter of common knowledge to those skilled in this particular line of endeavor that present day brake shoes are subjected to fracturing and such fractures incapacitate the brakes for effective operation. In addition, the fragments of the brake shoe frequently become displaced and cause serious troubles.

Dislodged fragments dropping from fractured brake shoes have been found to drop into frogs and switches, which result in train derailments. When used on elevated railroads, displaced fragments fall to the street and endanger the life of pedestrians. Moreover, the maintenance of cost to railroad companies are needlessly increased because of this disruptible disadvantage.

Another inferior feature of the present brake shoe is that the constant vibration of the shoe on the head causes the lug of the shoe to wear and when the lug is unduly worn through the shoe will bodily drop out from the brake head.

What I have endeavored to do is to provide a two-part assembly, one part comprising the head and the other part the shoe, and said parts being joined together through the medium of a novel dove-tail joint, and said joint possesses other added features, all of which contribute their proportionate share to the structure as a whole, whereby to provide a novel contribution to the art, susceptible of better fulfilling the requirements of an invention of this class.

In the drawings:

Figure 4 is a side elevational view of the head.

Figure 5 is a bottom plan view of said head.

Figure 1:
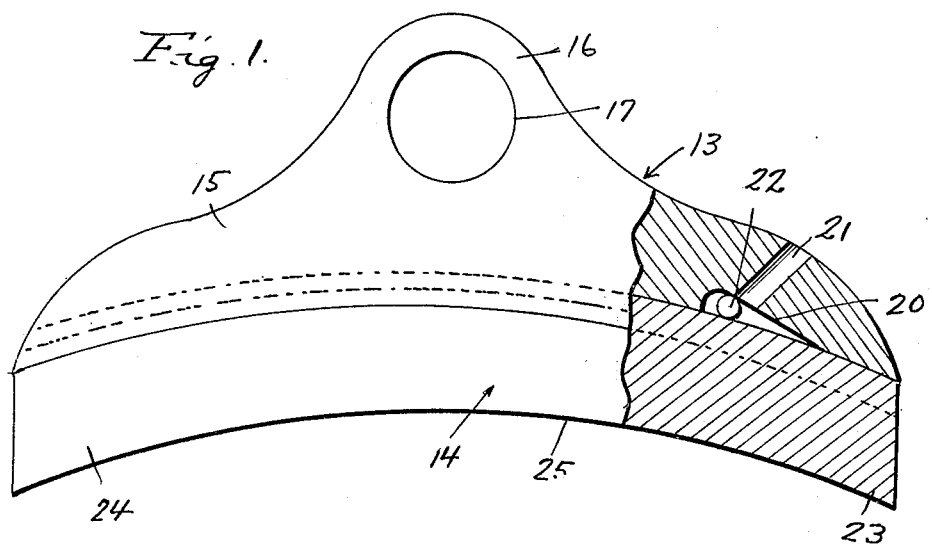
Figure 1 is a view in section and elevation observing the side configuration of the new assembly.

Figures 6 and 7 are sections on the lines 6—6 and 7—7 respectively of Figure 4 looking in the direction of the arrows.

Figure 8 is a plan view of a slightly different form or type of head.

Figure 9 is an edge elevation thereof.

Figure 10 is a longitudinal section on the line 10—10 of Figure 8.

Figure 11 is a cross section on the line 11—11 of Figure 9.

Figure 12 is a perspective view of a clamping and binding roller constituting a self-adjusting retainer.

Attention is first invited to Figures 1 to 7 inclusive, wherein it will be observed that the head is generally denoted by the numeral 13 and the shoe indicated by the numeral 14. The head comprises a suitably shaped casting 15 having its central portion provided with an integral suspension bracket 16 provided with the necessary brake rod aperture 17.

The curvate underside of the head is provided with a longitudinal groove 18 opening through opposite ends of said head and decreased in width toward one end such as at the left in Figure 5. The longitudinal walls of the groove are undercut as at 19 and at the wide end is a tapered depression or recess 20. A diagonal hole 21 registers with this recess and said recess is adapted to accommodate a binding roller 22.

The shoe 14 is in the form of an arcuate block commensurate in shape and proportion to correspond with the head 13. The right hand end 23 in Figure 1 is somewhat thinner than the opposite left hand end 24. The purpose in thickening the last named end is to prevent the shoe from riding over on the tread of the car wheel (not shown).

Figure 2:
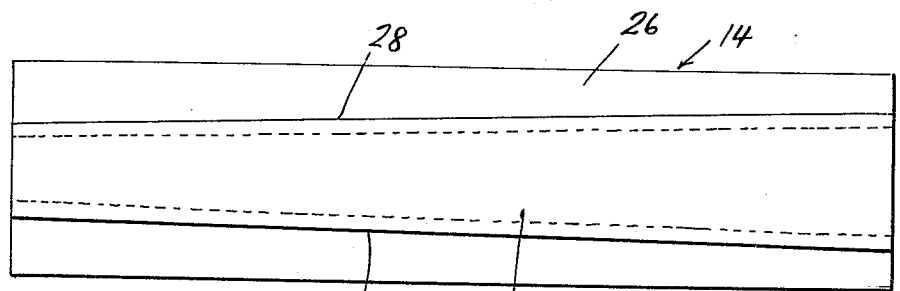
Figure 2 is a top plan view of the ribbed face of the shoe.
Figure 3:
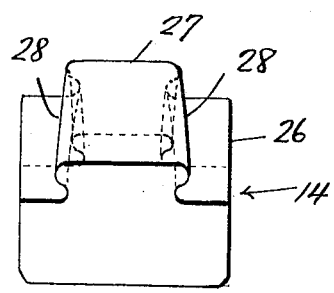
Figure 3 is an end view of Figure 2.

Otherwise stated, this thickened end portion guards against accidental displacement and improper braking action of the shoe. The curvature of the braking surface 25 is shaped to co-act intimately with the tread of the wheel. The upper face or top 26 of the shoe, as seen in Figure 2 is fashioned with a longitudinally tapered rib 27 whose overhanging edge portions 28 constitute flanges for reception in the undercut walls 19. Thus, these features co-operate in producing a novel self-wedging dove-tailed joint between the shoe and head.

It is to be observed in Figure 1 that the depth of the pin retaining recess 20 is decreased in a direction opposite to the diminished end portion of the rib 27, and any tendency of the rib to slip out of the groove 18 is prevented by the obvious binding action produced between the shoe and head through the medium of the self-rolling and maintaining pin 22. In a sense, this pin functions as a lock or retainer and is automatic in action.

Whenever it is necessary to replace the shoe, if it is unduly worn, a nailpunch or suitable instrument is placed through the hole 21 and engaged with the roller to force it into the large end of the recess and to release the grip temporarily so as to permit the shoe to be hammered out from the groove in said head.

It will be observed that the dove-tailed fastening arrangement of the brake shoe to the brake head positively prevents the shoe or any portion thereof, irrespective of the number of fractures, from dropping off the brake head. Consequently, the shoe may become fractured or cracked into fragments and still retain its full braking power and avoid injury in the aforesaid manners.

Secondly, the dove-tailed fastening arrangement does away with the customary soft steel lug now employed on present brake shoes, together with the fastening key therefor. Third, the dove-tailed fastening arrangement provides a full braking and bearing surface of the shoe on the head and wheel at all times.

The tapered dimensions of the groove and rib constitute a locking means for the shoe in one direction, while the self-binding roller automatically guards against displacement in an opposite direction. In addition, the thickened end portion of the shoe keeps it from climbing the wheel which sometimes happens when the shoe is uniform in thickness from end to end.

The fundamental principles illustrated in the form of the invention seen in Figures 8 to 11 are the same as already described. The principal improvement here is in the configuration or shape of the brake head 29. This head is also formed with a longitudinal curved groove or key way as it is sometimes called, indicated at 30 and having undercut walls 31 to accommodate the rib 27 of the shoe.

The end portions 32 are reinforced for strength. The intermediate upstanding hanger bracket 33 is shaped differently for adaptation to certain brake equipment. The recess 34 for accommodating the binding roller 35 is formed by casting the web of the head with an elevated portion 36. This portion 36 is formed with an access hole 37.

It is thought from the foregoing description that the advantages and novel features of the invention will be readily apparent.

It is to be understood that changes may be made in the construction and in the combination and arrangement of the several parts, provided that such changes fall within the scope of the appended claims.

I claim:

1. A longitudinally curved brake head having suspension means and provided in its bottom with a longitudinal groove, an arcuate brake shoe having a rib fitting in said groove, the rib and groove being shaped at corresponding ends to prevent displacement of the shoe through said ends, and self-acting means at the opposite end of the head and shoe to prevent displacement of the shoe through the last named end.

2. A longitudinally curved brake head having suspension means and provided in its bottom with a longitudinal groove, an arcuate brake shoe having a rib fitting in said groove, the rib and groove being shaped at corresponding ends to prevent displacement of the shoe through said ends, and self-acting means at the opposite end of the head and shoe to prevent displacement of the shoe through the last-named end, the head at the last named end being formed with a hole adapted to accommodate an instrument for dislodging the retaining means temporarily to permit extraction of the shoe for repair purposes.

3. An assembly of the class described, comprising, in combination, a brake head in the form of a single casting including an integral apertured attaching bracket, and formed in its bottom face with a longitudinal curved groove opening through opposite ends of the head, the side walls of said groove being undercut to provide keyways, said groove being longitudinally tapered and therefore of general wedge-shaped configuration in longitudinal dimension, the opposite wide end of the groove being countergrooved to provide a recess, said recess being tapered in a direction opposite to the restricted end of said groove, the last-named end portion of the head being formed with an inturned hole opening at one end through the top of the shoe and having its opposite end communicating with said recess, and a roller pin confined in said recess and adapted to function as a self-acting retaining element, and an arcuate block-like shoe having a rib for reception in said groove, the longitudinal portions of the rib being provided with flanges functioning as keys receivable in said keyway.

4. An assembly of the class described, comprising, in combination, a brake head in the form of a single casting including an integral apertured attaching bracket, and formed in its bottom face with a longitudinal curved groove opening through opposite ends of the head, the side walls of said groove being undercut to provide keyways, said groove being longitudinally tapered and therefore of general wedge-shaped configuration in longitudinal dimension, the opposite wide end of the groove being countergrooved to provide a recess, said recess being tapered in a direction opposite to the restricted end of said groove, the last-named end portion of the head being formed with an inclined hole opening at one end through the top of the shoe and having its opposite end communicating with said recess, and a roller pin confined in said recess and adapted to function as a self-acting retaining element, and an arcuate block-like shoe having a rib for reception in said groove, the longitudinal portions of the rib being provided with flanges functioning as keys receivable in said keyways, said shoe being thicker at one end for the purpose specified.

5. As a new product of manufacture, a brake head for use and association with a shoe of the class described comprising a longitudinally curved body cast with an arcuate longitudinal wedge-shaped groove whose side wall portions are undercut to form retaining keyways, the web portion of said head at one end being fashioned with a raised segment defining a pocket for reception of a retaining pin, said segment being apertured for the purpose specified.

In testimony whereof I affix my signature.

RAYMOND L. JIRKA.